(12) United States Patent  (10) Patent No.: US 12,451,013 B2
Schwartz  (45) Date of Patent: Oct. 21, 2025

(54) TRACK ASSOCIATIONS AT LEAST PARTIALLY BASED ON LOW CONFIDENCE DETECTIONS

(71) Applicant: Aptiv Technologies AG, Schaffhausen (CH)

(72) Inventor: David Aaron Schwartz, Moorpark, CA (US)

(73) Assignee: Aptiv Technologies AG, Schaffhausen (CH)

( * ) Notice: Subject to any disclaimer, the term of this patent is extended or adjusted under 35 U.S.C. 154(b) by 680 days.

(21) Appl. No.: 17/658,525

(22) Filed: Apr. 8, 2022

(65) Prior Publication Data

US 2023/0326346 A1  Oct. 12, 2023

(51) Int. Cl.
*G08G 1/16* (2006.01)
*G01S 13/931* (2020.01)
*G08G 1/056* (2006.01)

(52) U.S. Cl.
CPC ........... *G08G 1/166* (2013.01); *G01S 13/931* (2013.01); *G08G 1/056* (2013.01)

(58) Field of Classification Search
CPC ...... G08G 1/166; G08G 1/056; G01S 13/931; G01S 2013/9323; G01S 2013/9324; G01S 13/726; G01S 7/36; G01S 13/66
See application file for complete search history.

(56) References Cited

U.S. PATENT DOCUMENTS 8,527,445 B2 * 9/2013 Karins .................. G06N 7/01
 706/46
10,160,448 B2 * 12/2018 Liu ...................... B60W 30/09
10,788,583 B2 * 9/2020 Robinson ................ G01S 17/66
12,091,056 B2 * 9/2024 Ramakrishnan ..........................
 B60W 60/00276
2018/0284260 A1 * 10/2018 Oyaizu ..................... G06T 1/00

(Continued)

FOREIGN PATENT DOCUMENTS

WO   WO-2022064588 A1 * 3/2022 ........... G01S 13/867

OTHER PUBLICATIONS

Machine Translation: WO-2022064588-A1 (Year: 2022).*

(Continued)

*Primary Examiner* — Anne Marie Antonucci
*Assistant Examiner* — Connor L Knight
(74) *Attorney, Agent, or Firm* — Harness, Dickey & Pierce, P.L.C.

(57) ABSTRACT

This document describes techniques for performing track associations at least partially based on low confidence detections. For object trackers, which rely on measurement detections that are associated with a reported confidence, there is no direct tradeoff between a true positive track rate and a false positive track rate that applies to improving the accuracy of state estimates of tracks. To increase the true positive track rate while reducing the false positive track rate, a parameter is maintained for each track. Referred to as Probability of Existence (PoE), it is an estimate of likelihood that a real object exists with a true state that approximates an estimated state for that track. By considering PoE in combination with the reported confidence in the measurement detections being used, object tracking using radar and other sensors technologies is improved, so real-objects are reported more-quickly and accurately, and false objects are reported less often.

19 Claims, 4 Drawing Sheets

(56) References Cited

U.S. PATENT DOCUMENTS

| | | | |
|---|---|---|---|
| 2019/0258878 A1* | 8/2019 | Koivisto | G06V 10/46 |
| 2021/0331695 A1* | 10/2021 | Ramakrishnan | B60W 60/00276 |
| 2022/0092875 A1* | 3/2022 | Bauch | B60W 30/12 |
| 2023/0061682 A1* | 3/2023 | Gade | B60W 50/0098 |

OTHER PUBLICATIONS

Darko Musicki, "Track Score and Target Existence", 2006 9th International Conference on Information Fusion, Jul. 10, 2016, 7 pages.

Richard Altendorfer, et al., "A New Confidence Estimator for Vehicle Tracking Based on a Generalization of Bayes Filtering", IEEE Intelligent Transportation Systems Magazine, Oct. 25, 2012, pp. 30-41.

Seung-Hwan Bae, et al., "Robust Online Multiobject Tracking With Data Association and Track Management", IEEE Transactions on Image Processing, vol. 23, No. 7, Jul. 2014, pp. 2820-2833.

Yifu Zhang, et al., "ByteTrack: Multi-Object Tracking by Associating Every Detection Box", Oct. 14, 2021, 13 pages.

"Extended European Search Report", EP Application No. 23160244.2, Sep. 1, 2023, 13 pages.

Altendorfer, et al., "A Confidence Measure for Vehicle Tracking Based on a Generalization of Bayes Estimation", 2010 IEEE Intelligent Vehicles Symposium, Jun. 21, 2010, pp. 766-772.

Sinha, et al., "Track Quality Based Multitarget Tracking Approach for Global Nearest-Neighbor Association", IEEE Transactions on Aerospace and Electronic Systems, vol. 48, No. 2, Apr. 2012, pp. 1179-1191.

\* cited by examiner

TRACK ASSOCIATIONS AT LEAST PARTIALLY BASED ON LOW CONFIDENCE DETECTIONS

BACKGROUND

Tuning an object tracker typically involves balancing a tradeoff between reducing false positive and false negative track rates. Likewise, tradeoffs between other related measures (e.g., precision or recall) may be considered. If an object tracker is tuned to not consider low confidence measurement detections, which is the case with some commercially available trackers, there is a chance that some actual objects, which are otherwise identifiable from the measurement detections, can be missed and not tracked. This is especially the case when trying to achieve low false object track rates. Some objects that pose real risks to collision may be misidentified or unreported by a poorly tuned object tracker. When relied on by a perception system of a vehicle, this inadequate situational awareness is a risk to safety.

SUMMARY

This document describes techniques and systems for performing track associations at least partially based on low confidence detections. In one example, a method includes maintaining, by an object tracker, a series of tracks including estimated measurements of at least some measurement detections output from an object detector model that processes sensor data to estimate portions of objects in an environment. The method further includes updating estimated states of the tracks or generating new tracks based on probability of existence (PoE) for the tracks and a reported model confidence in the measurement detections. The method also includes, responsive to updating the estimated states of the tracks based on PoE for the tracks and the model confidence in the measurement detections, outputting, from the object tracker, the tracks for use by a vehicle system to enable the vehicle to avoid the objects in the environment.

These and other described techniques may be performed by hardware or a combination of hardware and software executing thereon. For example, a computer-readable storage media may have instructions stored thereon and that when executed configure a processor to perform the described techniques. A system may include means for performing the described techniques. A processor or processor unit may be part of a system that is configured to execute the methods and techniques described herein.

Through implementation of these and other examples contemplated by this disclosure, efficient and accurate track associations at least partially based on low confidence detections can be achieved to estimate objects more accurately than from using other tracking techniques. This Summary introduces simplified concepts for performing track associations at least partially based on low confidence detections, for example, vehicles (e.g., trucks, automobiles) equipped with radar trackers or other components that execute detection based tracking, as further made clear from the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of performing track associations at least partially based on low confidence detections are described in this document with reference to the Drawings that may use same numbers to reference like features and components, and hyphenated numbers to designate variations of these like features and components. The Drawings are organized as follows.

DETAILED DESCRIPTION

Introduction

A perception system (e.g., for a vehicle safety or automated driving system) may rely on an output from an object tracker. This output can include a series of tracks conveying information about objects observed from sensor data obtained for an environment. These object trackers may rely on object detectors to maintain situational awareness of the objects. The object detectors can be of various types, including model based, and more particularly, trained models configured to apply machine-learning (ML) techniques. Typically, measurement detections are produced, in addition to an estimate of likelihood, or confidence, as to whether that detection measurement is within a measurement space of a specified class of object. Some measurement detections are false and not representative of actual objects in the environment. It is important that an object tracker only generate tracks to actual objects so as to provide accurate situational awareness; this enables vehicle functions to execute safely, which can improve vehicle handling and control. A specific tracking process is executed to ensure tracks are not generated or updated based on false measurement detections.

Some commercially available software products can be used to implement such a tracking process. Some are developed specifically to handle vision occlusion in camera and video-based object tracking. In that context, measurement detections reported with low confidence may be a consequence of partial occlusions in camera and video based measurement detections. In these programs, the confidence or estimate of likelihood that is output for each measurement detection is used in deciding whether to use that measurement detection for generating or updating an existing track. Fixed thresholds are used to select, based on the confidences, or estimates of likelihood, which measurement detections are to be used to support tracks. Measurement detections with confidence that satisfies a high confidence threshold are used to support existing or generate new tracks. Remaining measurement detections with confidence that satisfies a low confidence threshold are used to enhance or update these tracks. The reason for the fixed thresholds is that as the confidence value decreases, the probability of false detections increases. For instance, selecting these thresholds requires considering a tradeoff between reducing false positive or false negative track rates or tradeoffs between other desirable characteristics (e.g., precision and recall).

With these or other similar techniques, an object tracker can be purposely tuned or configured to not consider low confidence measurement detections. However, such an object tracker poses a risk if relied on by a perception system, e.g., for automated driving. There is a chance that some actual objects, which are otherwise identifiable from measurement detections, can be missed by an object tracker with a fixed threshold set too high. This is especially the case when an object tracker is designed to achieve a low false track rate. By missing or failing to track actual objects to keep the low false track rate minimized, information needing to be considered for safety is discarded, which may cause the perception system to fail at providing adequate situational awareness in many common driving scenarios.

This document describes techniques for performing track associations at least partially based on low confidence detections. For object trackers, which rely on measurement detections that are associated with a reported confidence, there is no direct tradeoff between a true positive track rate and a false positive track rate that applies to improving the accuracy of state estimates of tracks. To increase the true positive track rate while reducing the false positive track rate, a parameter is maintained for each track. Referred to as Probability of Existence (PoE), it is an estimate of likelihood that a real object exists with a true state that approximates an estimated state for that track. By considering PoE in combination with the reported confidence in the measurement detections being used, object tracking using radar and other sensors technologies is improved, so real-objects are reported more-quickly and accurately, and false objects are reported less often.

Through this approach for performing track associations at least partially based on low confidence detections, at least two problems are solved. First, the techniques prevent failures to update tracks because there is too low confidence in the measurement detections. Second, the techniques prevent delays during track initialization steps; tracking occurs (even if in the background) using low confidence measurement detections so when the confidence in the track they support is sufficient and/or confidence in the measurement detections increases, the tracks are already in a stable track state and ready for reporting.

Example Environment

Figure 1:
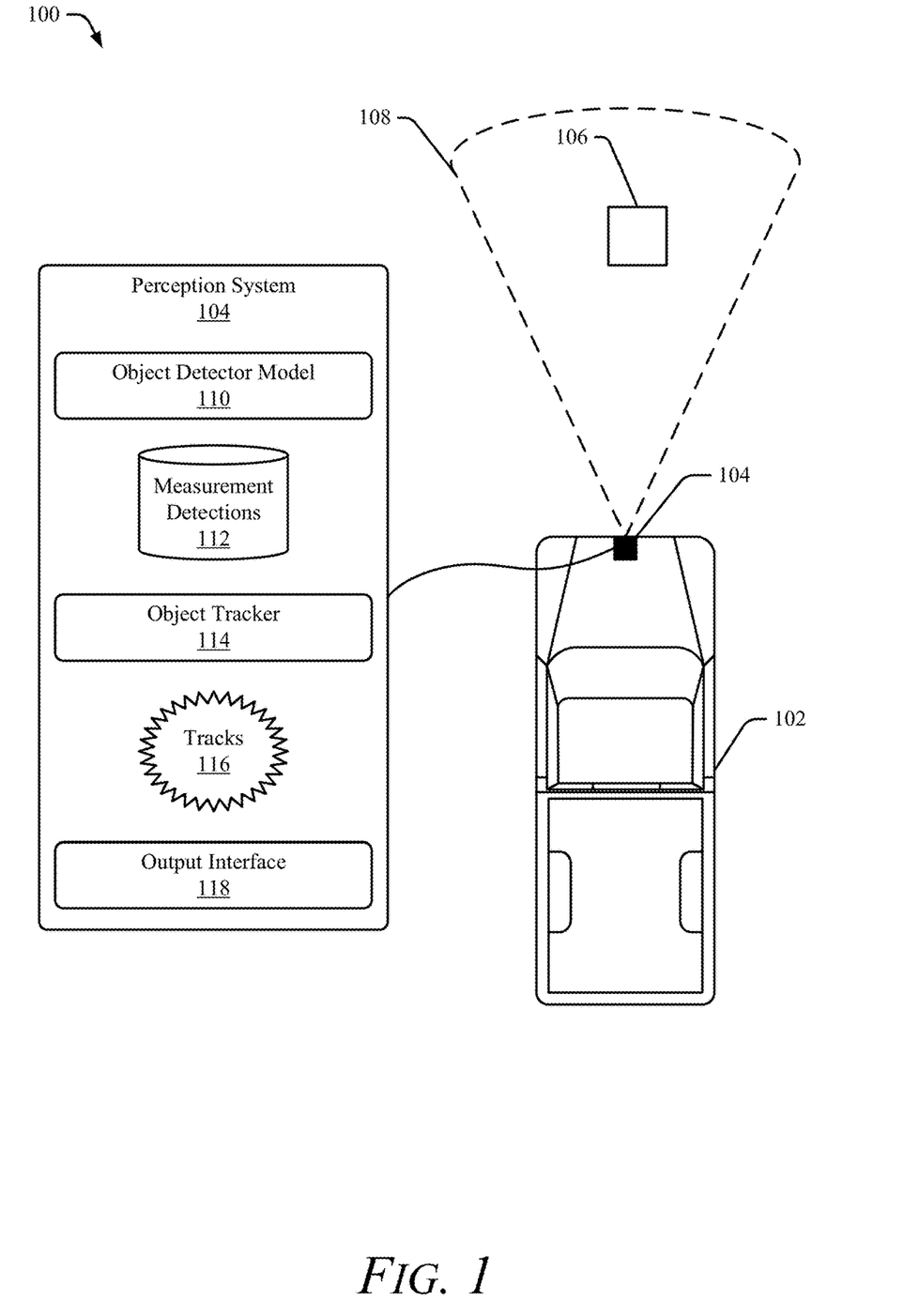
FIG. 1 illustrates an example environment for performing track associations at least partially based on low confidence detections.

FIG. 1 illustrates an example environment 100 for performing track associations at least partially based on low confidence detections, for example, by a vehicle 102. Although illustrated as a passenger truck, the vehicle 102 can represent other types of motorized vehicles (e.g., a car, motorcycle, bus, tractor, semi-trailer truck), non-motorized vehicles (e.g., a bicycle), railed vehicles (e.g., a train), watercraft (e.g., a boat), aircraft (e.g., an airplane), spacecraft (e.g., satellite), and the like. The depicted environment 100 includes the vehicle 102 traveling on a roadway. The vehicle 102 is equipped with a perception system 104 for detecting an object 106 (or other like it) present on or near the roadway, which can impact how or whether the vehicle 102 can continue to travel.

The perception system 104 is used to relay information to other systems of the vehicle 102 about objects detected in the environment 100, such as an object 106 in a travel path of the vehicle 102. A region of interest associated with the perception system 104 at least partially surrounds the vehicle 102. This region, when monitored by the perception system 104, is referred to as a field of view 108 (also referred to as an instrumented field of view). The perception system 104 functions based on an input of sensor data (e.g., point clouds, data cubes), which can be obtained from a single type of sensor (e.g., radar) or a variety of different types of sensors (e.g., radar and camera combined). For ease of description, the sensor data obtained by the perception system 104 is described primarily as being radar data obtained from a radar system of the vehicle 102 or the perception system 104. Components of the perception system 104 can be installed on, mounted to, or integrated with any part of the vehicle 102, such as in a front, back, top, bottom, or side portion of the vehicle 102, a bumper, a side mirror, part of a headlight and/or taillight, or at any other interior or exterior location of the vehicle 102 where measurement detection using point cloud sensor data is desired. Careful selection or re-positioning of components of the perception system 104 and/or the vehicle sensor system (e.g., radar system) to which it connects can further cause the field of view 108 to have a particular shape or size.

Included in the perception system 104 is an object detector model 110, an object tracker 114, and an output interface 118. Also maintained by the perception system 104 is a set of one or more measurement detections 112 in addition to a series of one or more tracks 116. Portions of the object detector model 110, the object tracker 114, or the output interface 118 may be implemented as software or firmware executing on a processor or other hardware of the perception system 104. Executable instructions and/or data associated with these components may be stored by the perception system 104 on a computer readable storage media (CRM). In that case, the processor may load data and/or instructions from the CRM to execute operations of the perception system 104, including performing various functions in furtherance of object tracking.

The object detector model 110 is configured to process sensor data to estimate portions of objects in an environment and in response, configured to output the measurement detections 112. The measurement detections 112 include estimated measurements of objects that are discoverable from sensor data captured for the field of view 108. The object detector model 110 may be a model programmed (e.g., trained using ML, configured to apply ML) to identify objects or portions thereof from an input of sensor data. For example, a radar based ML model can be trained from training data sets or in an unsupervised fashion to derive the measurement detections 112 from an input of a radar data cube. The radar data cube can be compressed or uncompressed packets of information that characterizes radar returns (e.g., point clouds), which reflect off objects present in the field of view 108. In FIG. 1, at least one of the measurement detections 112 corresponds to the object 106. When output from the object detector model 110, other components of the perception system 104 analyze the measurement detections 112, for example, to generate the tracks 116.

Included with each of the measurement detections 112 is a confidence applied by the object detector model 110. This confidence provides a measurement of an estimate of the likelihood, or confidence, that such an object (e.g., of a specified class) exists in the field of view 108 close to that specific measurement.

The object tracker 114 generates and maintains the tracks 116 to objects in the field of view 108 based on the measurement detections 112 received from the object detector model 110. Each of the tracks 116 is to a different object detected in the field of view 108. The tracks 116 include estimated measurements of at least some measurement detections 112 output from the object detector model 110. The estimated measurements are contained in fields of information, including bounding box dimensions, size and position measurements, classifications, and other data characterizing a vehicle, pedestrian, traffic sign, or other object that appears in a region being monitored by the perception system 104. One of the tracks 116 may correspond to the object 106. The object tracker 114 performs operations to update the fields of information in the tracks 116 using updated measurement detections 112 output from the object detector model 110. In this way, the perception system 104 is able to provide situational awareness to the vehicle 102, including detailed characteristics within each of the tracks 116 of objects in the field of view 108.

The output interface 118 is configured to send the tracks 116 to other systems of the vehicle 102. When relied on for driving or safety functions of the vehicle 102, the tracks 116 provide responsive and accurate situational awareness to potential obstacles. The object tracker 114 generates the tracks 116 for the output interface 118, which handles transmission on behalf of the perception system 104 to other components of the vehicle 102. For example, a controller or other downstream component of the vehicle 102 (e.g., a vehicle system) can use the tracks 116 to control the vehicle 102 to avoid collisions or enable other vehicle systems to otherwise promote safe driving.

In generating the tracks 116, the object tracker 114 is configured to perform track associations at least partially based on low confidence groups of the measurement detections 112. The object tracker 114 maintains the tracks 116 by updating estimated states of the tracks or generating new tracks based on an additional parameter applied to each of the tracks 116. The object tracker 114 computes and applies a PoE for each the tracks 116. Based on the PoE for the tracks and a reported model confidence in the measurement detections 112 associated with the tracks 116, the estimates states for the tracks 116 are updated. The PoE of a particular track is an estimate of likelihood that a real object represented by the track has a true state close to the estimated state of that track. Responsive to updating the estimated states of the tracks 116 based on the PoE for the tracks 116 and the reported model confidence in the measurement detections 112, the object tracker 114 can output the tracks 116 (e.g., for use by a vehicle system to avoid the objects in the environment). By considering the track PoE in combination with the confidence in the measurement detections 112 used to generate the track, the object tracker 114 is able to increase the true positive track rate of the perception system 104, and the false positive track rate may be reduced.

To determine the PoE, the object tracker 114 may be viewed as a mean estimator of object existence, which can be modelled as a Markov Chain. For example, the Markov Chain may assume that if the target exists, the target is always detectable, and its detection measurements exist in any given sample of sensor data, which is equivalent to a probability of detection of up to and including one hundred percent. In another example, the Markov Chain also allows situations when there is a possibility that the target exists, but it is temporarily not detectable during some of the sensor scans. This type of model can be useful in situations of unknown and/or variable probability of detection, such as common driving scenarios on a road. The models of the object tracker 114 may offer additional parameters to tune the performance and to tailor them for a specific application. No matter the model used, the object tracker 114 is enabled to provide the PoE for each of the tracks 116, which can be considered in reporting or not reporting the tracks 116.

On each update cycle of the object tracker 114, PoE may be considered by performing the following sequence of steps:

1. The object tracker 114 time updates, predicts, the tracks 116 to the current measurement time.
2. The tracks 116 with PoE satisfying a high PoE threshold are associated with measurement detections 112 having confidence that satisfies a high confidence threshold.
3. For the tracks 116 not yet associated, and the remaining unassigned measurement detections 112, the object tracker 114 associates the tracks 116 with PoE that does not satisfy the high PoE threshold with the measurement detections 112 having confidence that satisfies the high confidence threshold.
4. For the tracks 116 not yet associated, and the remaining unassigned measurement detections 112, the object tracker 114 associates the tracks 116 with PoE that satisfies the high PoE threshold with measurement detections 112 having confidence that satisfies a low confidence threshold.
5. For the tracks 116 not yet associated, and the remaining unassigned measurement detections 112, the tracks 116 with PoE that does not satisfy the high PoE threshold are associated with measurement detections 112 having confidence that satisfies the low confidence threshold.
6. State estimates of the tracks 116 are measurement updated with the associated measurement detections 112. If measurement uncertainty is not directly reported with the measurement detections 112, the object tracker 114 may attribute a larger variance or covariance to measurement detections 112 having confidence that does not satisfy the high confidence threshold. Measurement update includes the update of the PoE.
7. The object tracker 114 creates new tracks 116 with remaining unassigned measurement detections 112 having confidence that satisfies the high confidence threshold.
8. The object tracker 114 creates new Low PoE tracks 116 with remaining unassigned measurement detections 112 having confidence that satisfies the low confidence threshold.
9. The object tracker updates track status and performs track maintenance, including deleting tracks that have not had sufficient associated measurements in the prior cycles.

The details of each of these steps is described below with reference to processes shown in FIGS. 2 and 3. The thresholds mentioned above (e.g., high PoE, high and low confidence) can be tunable parameters of the object tracker 114, depending on application. Some systems of the vehicle 102 may prefer to receive tracks sooner at the expense of measurement confidence or accuracy and may adjust the high PoE and/or high confidence thresholds to be lower; other applications on the vehicle 102 may weigh precision over latency and are willing to wait until the minimum measurement confidence and accuracy is achieved by setting the thresholds to be higher.

Example Process

Figure 2:
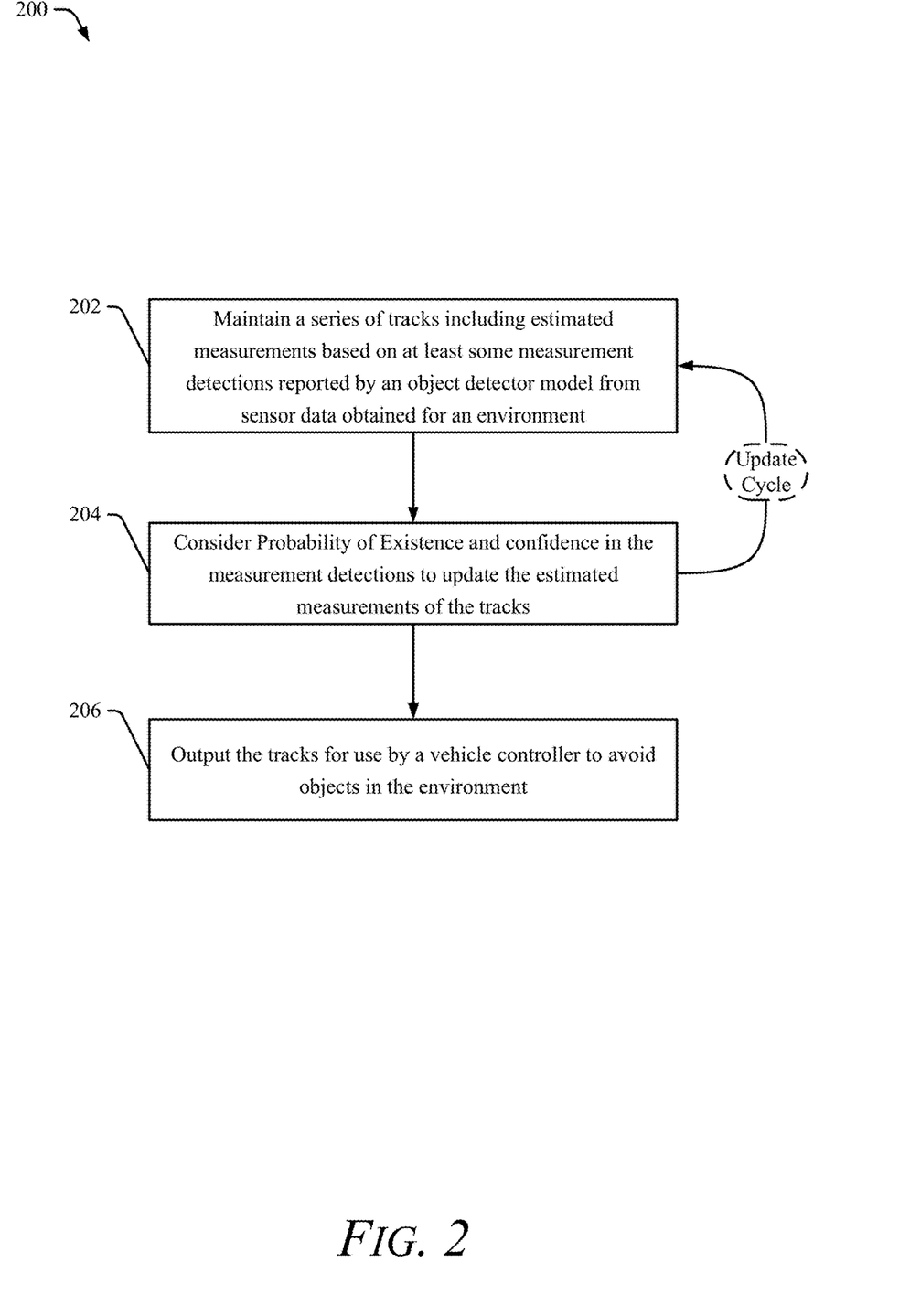
FIG. 2 illustrates a flow diagram of an example process utilizing track associations performed at least partially based on low confidence detections.

FIG. 2 illustrates a flow diagram of an example process 200 utilizing track associations performed at least partially based on low confidence detections. Operations (also referred to as steps) of the process 200 are numbered, however, this numbering does not necessarily imply a specific order of operations. The steps of the process 200 may be rearranged, skipped, repeated, or performed in different ways than the specific way it is shown in the diagram of FIG. 2. The process 200 is described in the context of FIG. 1, as if being performed by components of the perception system 104. For example, the object tracker 114 is configured to execute the process 200 the object tracker 114 to perform track associations at least partially based on low confidence groups of the measurement detections 112 received from the object detector model 110.

At 202, a series of tracks including estimated measurements of at least some measurement detections reported by an object detector model based on sensor data obtained for an environment is maintained. For example, the object tracker 114 maintains the tracks 116, which include estimated measurements of at least some of the measurement detections 112 output from the object detector model 110. The object detector model 110 may apply machine-learning to inputs of sensor data (e.g., radar data) to estimate, and optionally classify, portions of objects in the environment 100. Included with each of the measurement detections 112 is a corresponding confidence defined by the object detector model 110.

At 204, PoE and confidence in the measurement detections is considered to update estimated states of the tracks. For example, the object tracker 114 may perform functions for updating the estimated measurements of the tracks 116 based on the PoE for the tracks 116 and a reported model confidence in the measurement detections 112. This step is explained in greater detail in reference to FIG. 3.

In some examples, the object tracker 114 maintains an indication of the PoE of a track as a parameter or includes the PoE in an information field. The PoE of each of the tracks 116 is an estimate of likelihood that the particular track represents a real object having a true state close to an estimated state. Steps 202 and 204 may be repeated during the process 200 whether or not step 206 ever occurs. Each repetition is an update cycle to the tracks 116. Each tracker update cycle associated with the series of tracks represents a duration of time between periodic outputs of the tracks 116. An earlier output of the tracks 116 may include first PoE information, and a subsequent output of the tracks may include different PoE information based on newer information (e.g., more recently received radar data). For example, at every tracker update cycle, the object tracker 114 updates the estimated states of the tracks 116 and starts new tracks as needed. Additionally, the object tracker 114 updates the PoE of all the tracks. The PoE update includes such factors as: whether a track had an associated measurement, the innovation of that measurement, and various other factors indicative of existence. The PoE of each track is updated when tracks are time updated to the current measurement time, and then for each track with one or more associated measurements, the PoE is updated based on the associated measurements.

At 206, responsive to updating the estimated states of the tracks based on PoE for the tracks and the reported model confidence in the measurement detections, the tracks are output for use by a vehicle system to avoid objects of the environment 100. For example, the output interface 118 of the perception system 104 outputs the tracks 116 for use by a vehicle controller or active safety system of the vehicle 102 to avoid the objects in the environment 100.

In examples where the PoE is maintained in the tracks 116 as a parameter, other systems of the vehicle 102 that rely on the tracks 116 can utilize the PoE as well. A decision whether to take an action or perform a function of the vehicle 102 can be based on an indication the PoE that is applied to that track. This way, these actions or functions can be performed accurately with a high degree of confidence; functions of the vehicle 102 may be conditioned on having a minimum PoE to ensure vehicle operations account for only real objects having true states close to their estimated states. The object tracker 114 may include, in each of the tracks 116, an indication of the PoE for that track, and the output interface 118 may output the tracks 116, including the indications of the PoE, for use by a vehicle controller or other component of the vehicle 102.

Keeping a PoE parameter associated with each of the tracks 116 may provide other advantages, including an ability to group the tracks 116 according to different levels of PoE. For example, the object tracker 114 may maintain, based on an indication of the PoE for each of the tracks 116, a group of low PoE tracks and a group of non-low PoE tracks, including high PoE tracks.

The object tracker 114 can condition the output interface 118 by refraining from outputting any tracks from the group of low PoE tracks, while outputting all tracks from the group of non-low PoE tracks. This way low PoE tracks can still be tracked in case they are ever promoted to non-low (e.g., high) PoE status, but the low PoE tracks are not reported among the non-low PoE tracks, until the object tracker 114 deems them to be reliable enough for use in driving functions.

In other cases, the object tracker 114 can output at least some tracks from the group of low PoE tracks while outputting all tracks from the group of non-low PoE tracks. The group of low PoE tracks may be output including an indication that each is associated with low PoE. This way, even if tracks have low PoE, the low PoE tracks are reported soon after detection along with an indication of their PoE status so other components of the vehicle 102, rather than the object tracker 114, can likewise consider PoE to determine whether to rely on the tracks 116 for use in executing driving functions.

Using Poe and Confidence in Object Tracking

Figure 3:
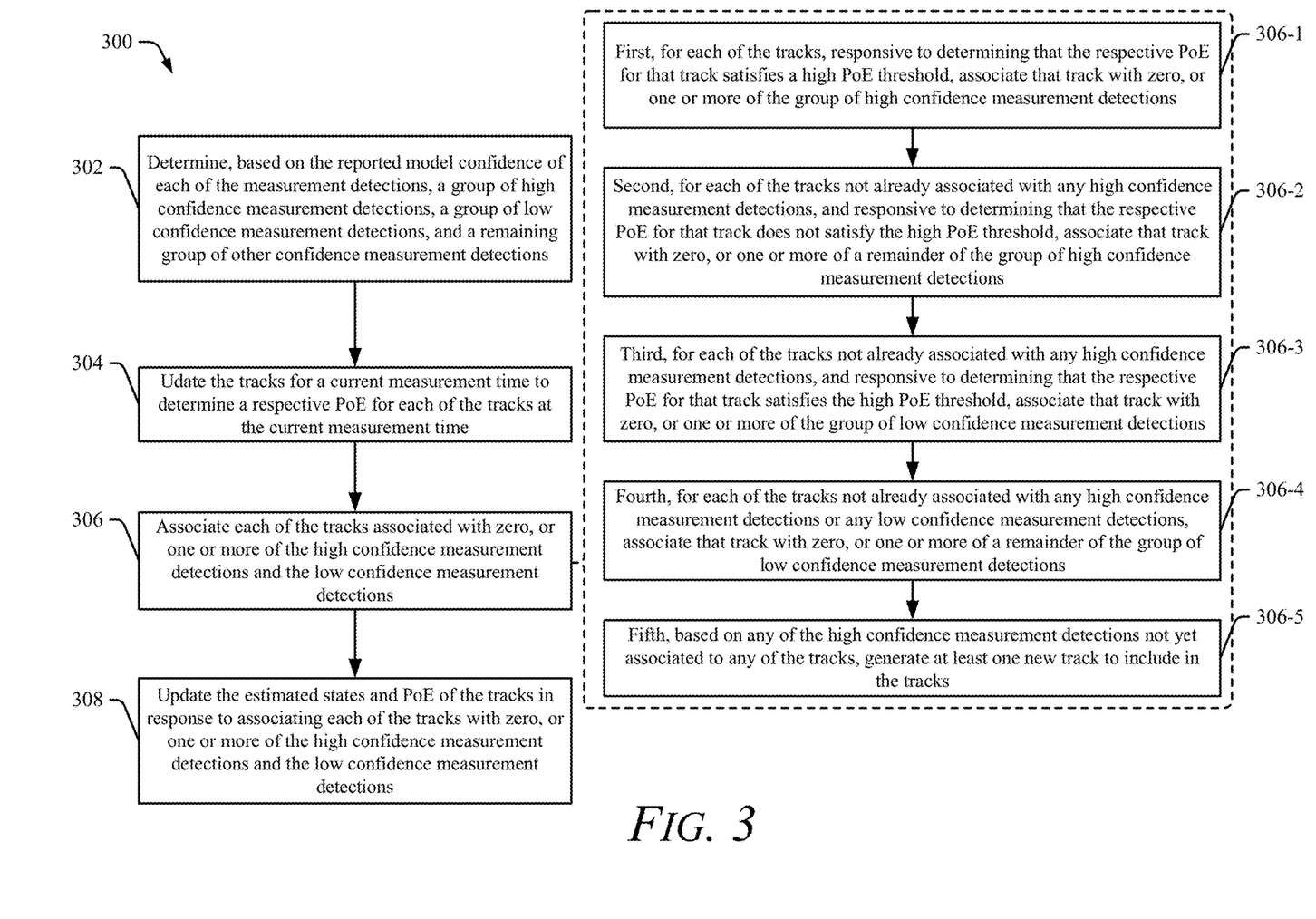
FIG. 3 illustrates a flow diagram of performing track associations at least partially based on low confidence detections.

FIG. 3 illustrates a flow diagram of a process 300 for performing track associations at least partially based on low confidence detections. The process 300 provides an example detail view of the step 204 from the process 200; FIG. 3 shows one way to consider PoE and confidence in measurement detections to update estimated measurements of tracks. Operations or steps of the process 300 are numbered; however, this numbering is not to imply a specific order because at least some of the steps of the process 300 may be rearranged, skipped, or performed in other ways than what is shown in FIG. 3. The ordering shown in FIG. 3 is a preferred implementation. The object tracker 114 is configured to execute the process 300 to update estimated states of the tracks 116 or generating new tracks 116 based on the PoE for the tracks 116 and the reported model confidence in the measurement detections 112.

At 302, based on the model confidence of each of the measurement detections, determined is a group of high confidence measurement detections, low confidence measurement detections, and other confidence measurement detections. The high confidence group of measurement detections satisfy a high confidence threshold of up to and including a maximum possible confidence (e.g., one, one hundred percent). The low confidence group of measurement detections satisfy a low confidence threshold but do not satisfy the high confidence threshold. The remaining group of other confidence measurement detections do not satisfy the low confidence threshold down to an including a minimum possible confidence (e.g., zero, zero percent). For example, confidence values are applied to the measurement detections 112 by the object detector model 110. Based on the confidence of the measurement detections 112, the object tracker 114 separates the measurement detections 112 into three groups. One group includes high confidence measurement detections having a confidence that satisfies a high confidence threshold. The other group includes low confidence measurement detections, which do not have the confidence to satisfy the high confidence threshold but do satisfy the low confidence threshold. A third group of any of the remaining detections 112 that do not satisfy either confidence threshold is determined and set aside. The object tracker 114 generates each of tracks 116 using the two groups of high and low confidence measurement detections 112.

At 304, the tracks are updated for a current measurement time to determine a respective PoE for each of the tracks at the current measurement time. For example, on each tracker update cycle, the tracks 116 are updated to include estimated states, based on predictions for a current time. The estimated states may be different from real states because of time that has passed since the sensor data used to generate the measurement detections 112 for that track is obtained. At this step, the PoE is estimated using the history of the measurement detections 112, and other factors such as measurement innovations, and prior knowledge. For example, a Markov Model can compute the PoE for one of the tracks 116, which may be a value from zero to one, zero to one hundred percent, or some other range. Based on the measurement detections 112, an indication of PoE for each of the tracks 116 is determined.

At 306, each of the tracks is associated with zero, or one or more of the high confidence measurement detections and the low confidence measurement detections. For example, each of the tracks 116 is matched with one or more of the measurement detections 112, for subsequently updating the state estimates of the tracks 116. Each detection may be associated with zero or one tracks. In some examples, the object tracker 114 only allows zero or one measurement detection to be associated with any of the tracks 116. In other examples, the object tracker 114 allows multiple associations to measurement detections any of the tracks 116. The process 300 applies to both situations.

At 308, the estimated states, and PoE, of the tracks are measurement updated in response to associating each of the tracks with zero, or one or more of the high confidence measurement detections and the low confidence measurement detections. For example, the object tracker 114 updates a state estimate of each of the tracks 116 using the high and/or low confidence measurement detections associated with that track at the step 306. During this stage, the low confidence measurement detections may be treated as having larger variance, or covariance than the high confidence measurement detections. This can also apply if the object detector model 110 does not directly report the measurement uncertainty with the measurement detection, and the object tracker 114, instead, derives the uncertainty.

The associations that occur at the step 306 can include several sub operations, shown as steps 306-1 through 306-5. The steps 306-1 through 306-5 may be executed in order to associate each of the tracks 116 with zero, or one or more of the high confidence measurement detections 112 and the low confidence measurement detections 112.

First, at step 306-1, for each of the tracks, responsive to determining that the respective PoE for that track satisfies a high PoE threshold, that track is associated with zero, or one or more of the high confidence measurement detections. For example, the tracks 116 may include at least one track with a PoE that satisfies the high PoE threshold. Detections may only be associated with zero or one tracks.

Second, at step 306-2, for each of the tracks not already associated with any high confidence measurement detections at step 306-1, and responsive to determining that the respective PoE for that track does not satisfy the high PoE threshold, that track is associated with zero, or one or more of a remainder of the high confidence measurement detections. Detections may only be associated with zero or one tracks. For example, the tracks 116 may include one or more tracks with a PoE that does not satisfy the high PoE threshold. Even though the PoE of the tracks is not high relative the high PoE threshold, these track can still be associated with remaining measurement detections 112 that are in the high confidence group. Most or all of the measurement detections 112 from the high confidence group are associated to some of the tracks 116 following steps 306-1 and 306-2.

Third, at step 306-3, for each of the tracks not already associated with any high confidence measurement detections at steps 306-1 or 306-2, and responsive to determining that the respective PoE for that track satisfies the high PoE threshold, that track is associated zero, or one or more of the low confidence measurement detections. Detections may only be associated with zero or one tracks. For example, the tracks 116 may include one or more tracks with a PoE that does satisfy the high PoE threshold, but that are not associated with high confidence detections. This high PoE track can still be associated with at least some of the measurement detections 112 from the low confidence group.

Fourth, at step 306-4, for each of the tracks not already associated with any high confidence measurement detections or any low confidence measurement detections, that track is associated with zero, or one or more of a remainder of the low confidence measurement detections. Detections may only be associated with zero or one tracks. For example, the tracks 116 may include one or more tracks with a PoE that does not satisfy the high PoE threshold and that is not associated with high confidence detections. This not high PoE track can still be associated with at least some of the measurement detections 112 that remain from the low confidence group.

Fifth, at step 306-5, based on any of the high confidence measurement detections not yet associated to any of the tracks, generating at least one new track to include in the tracks. For example, to ensure that the tracks 116 capture as many detectable objects as possible, new tracks can be created using any of the measurement detections 112 from the high confidence group that remain unassociated to any of the tracks 116.

After step 306-5, new low PoE tracks may be created with remaining unassigned measurement detections 112 from the low confidence group. At this point, following step 306-5, the tracks 116 are at least associated with high confidence measurement detections 112, and some are also associated with low confidence measurement detections 112. The object tracker 114 may additionally maintain within the tracks 116, a special subspecies of low PoE tracks. Each of the low PoE tracks is generated from a remainder of the low confidence measurement detections 112, which excludes the measurement detections 112 already part of the previously determined associations in steps 306-1 to 306-5.

During subsequent tracker update cycles the low PoE tracks may be promoted to one of the associations with high confidence measurement detections. Maintaining and tracking the low PoE tracks this way may prevent latency in their eventual initialization and reporting to the output interface 118 for inclusion among the tracks 116 being output from the perception system 104. This helps prevent false positives or false negatives by increasing a likelihood that identifiable objects are not missed, which can increase safety. In some cases, a vehicle system may consider the low PoE tracks to be in a sufficient state for reporting; the object tracker 114 may include the low PoE tracks for output by the output interface 118. For example, a separate series of low PoE tracks for use by a vehicle controller of the vehicle 102 may be provided from the output interface 118.

The process 300 shown in FIG. 3 can be followed by step 206 from the process 200. On a subsequent tracker update cycle, the process 300 repeats after the execution of step 202, during execution of step 204.

Example Vehicle Configuration

Figure 4:
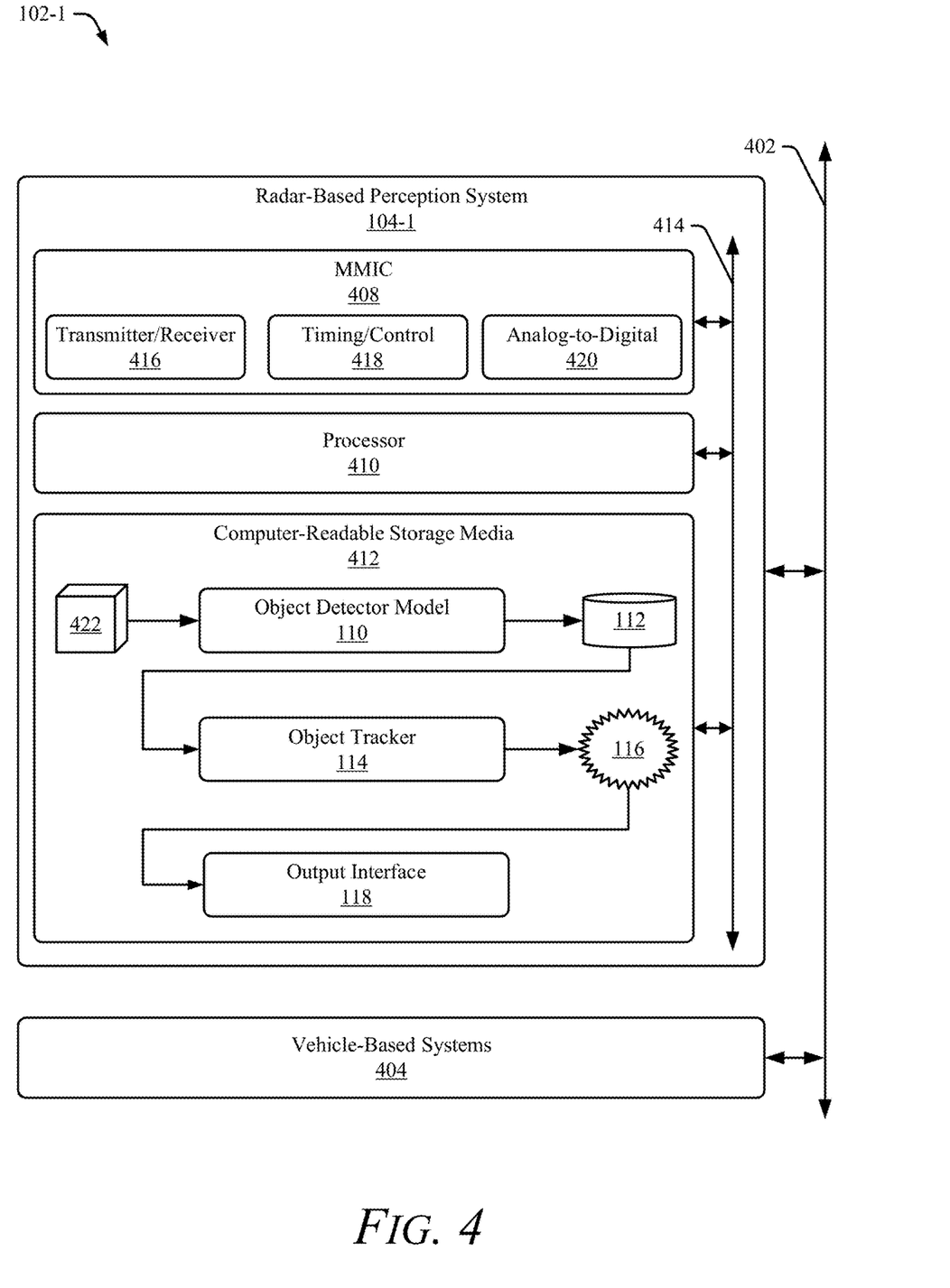
FIG. 4 illustrates an example vehicle including a system configured to perform track associations at least partially based on low confidence detections.

FIG. 4 illustrates an example vehicle 102-1 including a radar-based perception system 104-1 configured to perform track associations at least partially based on low confidence detections. The vehicle 102-1 is an example of the vehicle 102 and the radar-based perception system 104-1 is an example of the perception system 104, shown in greater detail. The vehicle 102-1 also includes vehicle-based systems 404 that are operatively and/or communicatively coupled to the perception system 104-1 via link 402, which may be one or more wired and/or wireless links including vehicle-based network communications for interconnecting the components of the vehicle 102-1. In some examples, the link 402 is a vehicle communication bus.

The vehicle-based systems 404 use vehicle data, including object tracking data provided on the link 402 by the perception system 104-1, to perform vehicle-based functions, which in addition to other functions may include functions for vehicle control. The vehicle-based systems 404 can include any conceivable device, apparatus, assembly, module, component, subsystem, routine, circuit, processor, controller, or the like, which uses radar data to act on behalf of the vehicle 102-1. As some non-limiting examples, the vehicle-based systems 404 may include a system for autonomous control, a system for safety, a system for localization, a system for vehicle-to-vehicle communication, a system for use as an occupant interface, and a system for use as a multi-sensor tracker. For example, upon receipt of the object tracking data (e.g., the tracks 116), functions provided by the vehicle-based systems 404 use portions of the object tracking data, including velocity measurements of objects detected in the field-of-view 108, to configure the vehicle 102-1 to safely drive without colliding with the detected objects.

The radar-based perception system 104-1 includes a monolithic microwave integrated circuit (MMIC) 408, a processor 410, and a CRM 412, communicatively coupled via a link 414. The processor 410, the CRM 412, and/or the MMIC 408 may comprise a radar chip, e.g., a system on chip. Other devices, antennas, and other radar components may be used by the radar-based perception system 104-1. In some examples, the processor 410 includes a controller, a control circuit, a microprocessor, its own chip, its own system, its own system-on-chip, a device, a processing unit, a digital signal processing unit, a graphics processing unit, or a central processing unit. The processor 410 may include multiple processors or cores, embedded memory storing executable software or firmware, internal/dedicated/secure cache or any other computer element that enables the processor 410 to execute machine-readable instructions for generating the tracks 116.

Machine-readable instructions that are executed by the processor 410 can be stored by the CRM 412. The CRM 412 may also be used to store data managed by the processor 410 during execution of the instructions. In some examples, the CRM 412 and the processor 410 are a single component, such as a system on chip, and in such a case, results in configuring at least a portion of the CRM 412 to be used as a dedicated storage for the processor 410. In some examples, access to the CRM 412 is shared by other components of the radar-base perception system 104-1 that are connected to the CRM 412. The processor 410 obtains instructions from the CRM 412; execution of the instructions configure the processor 410 to perform object tracking operations, such as radar based object tracking, which result in communication of the tracks 116 to the vehicle-based systems 404 and other components of the vehicle 102-1 over the link 402.

The primary way that the perception system 104-1 promotes situational awareness is in providing object tracking data on the link 402 so vehicle-based functions that rely on the object tracking data are performed using stable results to promote safe and comfortable driving. The vehicle-based systems 404 may use object tracking data provided on the link 402 to perform vehicle-based functions by warning systems, safety systems, or other of the vehicle-based systems 404 that rely on situational awareness provided by target tracking.

The tracks 116 are examples of object tracking data that is output on the link 402 to the vehicle-based systems 400. One of the tracks 116 can include information about movement of the object 106, such as a velocity, position, and the like, to enable the vehicle-based systems 404 to control or assist with braking, steering, and/or accelerating the vehicle 102-1 to avoid a collision with the object 106. Each of the tracks 116 can also include an indication of the PoE for that track. A system for autonomous control can use the tracks 116 received via the link 402 to autonomously or semi-autonomously drive the vehicle 102-1 safely on a road. A system for use as an occupant interface can use the information in the tracks 116, and base decisions in part on the PoE, to allow an operator or passengers to have situational awareness to make driving decisions or provide operator inputs to a controller for providing more buffer to avoid the objects. The tracks 116, their PoE, and other information contained therein may be provided to other vehicles using a system for vehicle-to-vehicle communication, to allow operators, passengers, or controllers of other vehicles to also avoid the objects being tracked or have confidence that the vehicle 102-1 is aware of their presence based on receipt of the tracks 116. By improving situational awareness for the vehicle 102-1 and other vehicles in the environment 100, the vehicle 102-1 can drive in a safer manner under manual, autonomous, or semi-autonomous control.

An output of radar data 422 may be provided to the processor 410 for input to the object detector model 110. An antenna or antenna array such as a multiple input multiple output (MIMO) may couple to the MMIC 408 to enable emission and reception of radar signals. An interface to the MIMO is provided by one or more transmitter/receiver elements 416 of the MMIC 408. Timing/control elements 418 and analog-to-digital converters 420 of the MMIC 408 format the radar data 422 into a suitable data structure (e.g., compressed data cube, uncompressed data cube) for input to the object detector model 110. The radar data 422 can include a radar data cube or other form of radar point cloud data indicative of radar returns detected in the environment 100 by the MMIC 408 based on radar returns captured from the field of view 108.

In this example, the CRM 412 includes instructions for configuring the processor 410 to provide functions of the object detector model 110, the object tracker 114, and the output interface 118, which are each examples of like numbered components from FIG. 1. In addition, the CRM 412 maintains the radar data 422 for subsequent access by the object detector model 110.

In operation, the MMIC 408 generates the radar data 422. Based on an input of the radar data 422, the measurement detections 112 are output from the object detector model 110. Included with each of the measurement detections 112 is a confidence reported by the object detector model 110.

The object detector model 110 is configured to obtain the radar data 422 generated by the MMIC 408, and process the radar data 422 (e.g., by executing a model) to establish the measurement detections 112 that eventually support the tracks 116. For instance, a model of any type (e.g., artificial neural network, long-short-term-memory network) may be trained to apply ML techniques to learning patterns in the radar data 422. Once trained, the patterns, when identified later in other driving scenarios, may support inferences about properties of objects that appear in the radar data 422. These inferences can include assigning a classification (e.g., vehicle type, pedestrian, infrastructure), estimated measurements of size, estimated measurements of trajectory, and any other information that might be predicted from the radar data 422 to characterize with as great a detail and precision as possible, objects that are discernable from the radar data 422. In the end, each of the measurement detections 112 corresponds to a particular object in the environment 100. The object detector model 110 includes a respective confidence associated with each of the measurement detections 112, indicating whether that measurement detection is consistent with the object classification assigned to the measurement detections 112.

When the object tracker 114 generates the tracks 116, they are eventually reported to the vehicle-based systems 404 via the output interface 118. That is, when the estimated track state of any of the tracks 116 established by the object tracker 114 is of sufficient quality to be reported on the link 402 to the vehicle-based systems 400, the object tracker 114 indicates to the output interface 118 to include that track in an output at the next reporting cycle.

In establishing each of the tracks 116, the object tracker 114 performs track associations at least partially based on low confidence detections. For example, as described above with mention to processes 200 and 300, this is performed in part by computing and considering PoE for each of the tracks 116; in addition, confidence in the measurement detections 112, as-is reported by the object detector model 110, is also considered. Any low PoE tracks created with remaining low confidence detections may need to undergo a modified PoE calculation at this time. The calculation of PoE for low PoE tracks may be such that PoE is less than the high PoE threshold unless the track has been measurement updated with measurement detections 112 from the high confidence group of detections. In other words, the calculation of the PoE for the low PoE tracks may be set to a value that is less than the high PoE threshold, unless the low PoE track can be measurement updated with a portion of the high confidence measurement detections 112 (e.g., the measurement detections 112 with confidence that satisfies the high confidence threshold). In practice, steps to handle low PoE tracks differently can include checking the measurement detections 112 associated with the low PoE tracks during each measurement update M in N sequential measurement updates (e.g., M multiplied by N total measurement updates) with measurement detections 112 with confidence that satisfies the high confidence threshold. A low pass filtered sequence of confidences associated with the measurement detections 112 exceeding a threshold can be used to handle the low PoE tracks differently when updating the PoE.

In some examples, the object tracker 114 executes an assignment algorithm that assigns the measurement detections 112 to the tracks 116. If the way the object tracker 114 assigns the measurement detections 112 to the tracks 116 includes a cost function that considers measurement detection confidence and/or track PoE, then the object tracker 114 may be able to perform fewer steps than those shown in FIGS. 2 and 3 to perform track associations at least partially based on low confidence detections. For example, it may be possible to merge the process 300 into fewer steps if the cost function being used by the object tracker 114 can receive the PoE and/or confidence of the measurement detections 112 as inputs. After the object tracker 114 determines the PoE and the estimated states of each of the tracks 116 is sufficient for output, each of the tracks 116 is reported on the link 402.

As mentioned above, new low PoE tracks may be generated at the end of the process 300. In some cases, during a subsequent update cycle, after starting out as a low PoE track, the track can be promoted with a high level of PoE and emerge among the tracks 116 with low latency; a track to an object may appear sooner than if the object tracker 114 instead waited until only high confidence measurement detections 112 can be used to improve the track. In addition, by outputting even low PoE tracks other downstream systems (e.g., the vehicle-based systems 404) can possibly benefit from earlier situational awareness about potential objects that do not have high confidence in their tracks. For instance, a fusion tracker can rely on the output of the tracks 116 and sort out using information from other sensors whether a low PoE track is likely to exist. This feedback can be returned to the object tracker 114 to cause the object tracker 114 to promote a low PoE track into being a high PoE track based on this ancillary information from the fusion tracker about it being highly likely to correspond to an object of the classification predicted by the object detector model 110.

By evaluating the object detector model 110 reported confidence in addition to computing PoE, the tracks 116 can be output with high precision and low latency. This may enable the vehicle-based systems 404 that receive the tracks on the link 402 to perform functions of the vehicle 102-1 with increased safety and greater precision.

Further Examples

Example 1. A method comprising: maintaining a series of tracks including estimated measurements of at least some measurement detections output from an object detector model that processes sensor data to estimate portions of objects in an environment; updating estimated states of the tracks or generating new tracks based on a probability of existence (PoE) for the tracks and a reported model confidence in the measurement detections; and responsive to updating the estimated states of the tracks based on the PoE for the tracks and the reported model confidence in the measurement detections, outputting the tracks for use by a vehicle system to avoid the objects in the environment.

Example 2. The method of example 1, wherein updating the estimated states of the tracks or generating new tracks based on the PoE for the tracks and the reported model confidence in the measurement detections comprises: determining, based on the reported model confidence of each of the measurement detections, a group of high confidence measurement detections that satisfy a high confidence threshold, a group of low confidence measurement detections that satisfy a low confidence threshold, and a remaining group of other confidence measurement detections that do not satisfy the low confidence threshold or the high confidence threshold; updating the tracks for a current measurement time to determine a respective PoE for each of the tracks at the current measurement time; associating each of the tracks with zero or one or more of the high confidence measurement detections and the low confidence measurement detections; and updating the estimated states of the tracks in response to associating each of the tracks with zero, or one or more of the high confidence measurement detections and the low confidence measurement detections.

Example 3. The method of example 2, wherein associating each of the tracks with zero, or one or more of the high confidence measurement detections and the low confidence measurement detections comprises: first, for each of the tracks, responsive to determining that the respective PoE for that track satisfies a high PoE threshold, associating that track with zero, or one or more of the high confidence measurement detections; second, for each of the tracks not already associated with any high confidence measurement detections, and responsive to determining that the respective PoE for that track does not satisfy the high PoE threshold, associating that track with zero, or one or more of a remainder of the high confidence measurement detections; third, for each of the tracks not already associated with any high confidence measurement detections, and responsive to determining that the respective PoE for that track satisfies the high PoE threshold, associating that track with zero, or one or more of the low confidence measurement detections; fourth, for each of the tracks not already associated with any high confidence measurement detections or any low confidence measurement detections, associating that track with zero, or one or more of a remainder of the low confidence measurement detections; and fifth, based on any of the high confidence measurement detections not yet associated to any of the tracks, generating at least one new track to include in the tracks.

Example 4. The method of any previous example, further comprising: maintaining a separate series of low PoE tracks each generated based on any low confidence measurement detections not associated to any of the tracks; and outputting the separate series of low PoE tracks for use by the vehicle system in addition to outputting the tracks.

Example 5. The method of any previous example, wherein the PoE of a particular track is an estimate of likelihood that a real object represented by the track has a true state close to the estimated state of that track.

Example 6. The method of any previous example, wherein updating the estimated states of the tracks occurs during each tracker update cycle associated with the series of tracks.

Example 7. The method of any previous example, further comprising: including, in each of the tracks, an indication of the PoE for that track; and outputting, for use by the vehicle system, the tracks including the indications of the PoE.

Example 8. The method of any previous example, further comprising: maintaining, based on an indication of the PoE for each of the tracks, a group of low PoE tracks and a group of non-low PoE tracks; and refraining from outputting any tracks from the group of low PoE tracks, while outputting all tracks from the group of non-low PoE tracks.

Example 9. The method of any previous example, further comprising: maintaining, based on an indication of the PoE for each of the tracks, a group of low PoE tracks and a group of non-low PoE tracks; and in addition to outputting the group of non-low PoE tracks, outputting the group of low PoE tracks including an indication that each is associated with low PoE.

Example 10. The method of any previous example, wherein the sensor data comprises radar data.

Example 11. A system comprising at least one processor configured to perform the method of any previous example.

Example 11. A system comprising means for performing the method of any previous example.

Example 13. A computer-readable storage media comprising instructions, that when executed, cause a processor to perform the method of any previous example.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims. In addition to radar systems, problems associated with performing track associations at least partially based on low confidence detections can occur in other systems (e.g., image systems, lidar systems, ultrasonic systems) that identify and process tracks from a variety of sensors. Therefore, although described to improve radar tracking, the techniques of the foregoing description can be adapted and applied to other problems to effectively detect and track objects in a scene using other types of object trackers.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

I claim:

1. A method comprising:
  maintaining a series of tracks including estimated measurements of at least some measurement detections output from an object detector model that processes sensor data to estimate portions of objects in an environment;
  determining reported model confidence in the measurement detections based on estimates of uncertainties in the measurement detections for the objects in the environment;
  updating estimated states of the tracks or generating new tracks based on a probability of existence (PoE) for the tracks and the reported model confidence in the measurement detections by,
    associating, based on both the PoE for the tracks and the reported model confidence, each of the tracks with one or more of the measurement detections classified as high confidence measurement detections or the measurement detections classified as low confidence measurement detections such that at least some of the tracks are associated with the low confidence measurement detections, and refining the estimated states of the tracks associated with low confidence measurement detections in subsequent update cycles using feedback from a fusion tracker incorporating ancillary information from other sensors to promote at least one of the tracks associated with the low confidence measurement detections to the high confidence measurement detections; and electronically instructing a vehicle system to control a vehicle to avoid the objects in the environment based on the updated tracks or new tracks.

2. The method of claim 1, wherein updating the estimated states of the tracks or generating new tracks based on the PoE for the tracks and the reported model confidence in the measurement detections comprises:

determining, based on the reported model confidence of each of the measurement detections, a group of the high confidence measurement detections that satisfy a high confidence threshold, a group of the low confidence measurement detections that satisfy a low confidence threshold, and a remaining group of other confidence measurement detections that do not satisfy the low confidence threshold or the high confidence threshold;

updating the tracks for a current measurement time to determine a respective PoE for each of the tracks at the current measurement time;

associating each of the tracks with zero or one or more of the high confidence measurement detections and the low confidence measurement detections; and updating the estimated states of the tracks in response to associating each of the tracks with zero, or one or more of the high confidence measurement detections and the low confidence measurement detections.

3. The method of claim 2, wherein associating each of the tracks with zero, or one or more of the high confidence measurement detections and the low confidence measurement detections comprises:

first, for each of the tracks, responsive to determining that the respective PoE for that track satisfies a high PoE threshold, associating that track with zero, or one or more of the high confidence measurement detections;

second, for each of the tracks not already associated with any high confidence measurement detections, and responsive to determining that the respective PoE for that track does not satisfy the high PoE threshold, associating that track with zero, or one or more of a remainder of the high confidence measurement detections;

third, for each of the tracks not already associated with any high confidence measurement detections, and responsive to determining that the respective PoE for that track satisfies the high PoE threshold, associating that track with zero, or one or more of the low confidence measurement detections;

fourth, for each of the tracks not already associated with any high confidence measurement detections or any low confidence measurement detections, associating that track with zero, or one or more of a remainder of the low confidence measurement detections; and fifth, based on any of the high confidence measurement detections not yet associated to any of the tracks, generating at least one new track to include in the tracks.

4. The method of claim 1, further comprising:

maintaining a separate series of low PoE tracks each generated based on any low confidence measurement detections not associated to any of the tracks; and outputting the separate series of low PoE tracks for use by the vehicle system in addition to outputting the tracks.

5. The method of claim 1, wherein the PoE of a particular track is an estimate of likelihood that a real object represented by the track has a true state close to the estimated state of that track.

6. The method of claim 1, wherein the updating includes updating the estimated states of the tracks during each of a plurality of tracker update cycles associated with the series of tracks.

7. The method of claim 1, further comprising:

including, in each of the tracks, an indication of the PoE for that track; and outputting, for use by the vehicle system, the tracks including the indications of the PoE.

8. The method of claim 1, further comprising:

maintaining, based on an indication of the PoE for each of the tracks, a group of low PoE tracks and a group of non-low PoE tracks; and refraining from outputting any tracks from the group of low PoE tracks, while outputting all tracks from the group of non-low PoE tracks.

9. The method of claim 1, further comprising:

maintaining, based on an indication of the PoE for each of the tracks, a group of low PoE tracks and a group of non-low PoE tracks; and in addition to outputting the group of non-low PoE tracks, outputting the group of low PoE tracks including an indication that each is associated with low PoE.

10. The method of claim 1, wherein the sensor data comprises radar data.

11. A system, comprising:

a memory; and at least one processor configured to execute code stored in the memory to configure the system to:

maintain a series of tracks including estimated measurements of at least some measurement detections output from an object detector model that processes sensor data to estimate portions of objects in an environment;

determine reported model confidence in the measurement detections based on estimates of uncertainties in the measurement detections for the object;

update estimated states of the tracks or generating new tracks based on a probability of existence (PoE) for the tracks and the reported model confidence in the measurement detections by, associating, based on both the PoE for the tracks and the reported model confidence, each of the tracks with one or more of the measurement detections classified as high confidence measurement detections or the measurement detections classified as low confidence measurement detections such that at least some of the tracks are associated with the low confidence measurement detections, and refining the estimated states of the tracks associated with low confidence measurement detections in subsequent update cycles using feedback from a fusion tracker incorporating ancillary information from other sensors to promote at least one of the tracks associated with the low confidence measurement detections to the high confidence measurement detections; and electronically instruct a vehicle system to control a vehicle to avoid the objects in the environment based on the updated tracks or new tracks.

12. The system of claim 11, wherein the processor is configured to update the estimated states of the tracks or generate new tracks based on the PoE for the tracks and the reported model confidence in the measurement detections by:

determining, based on the reported model confidence of each of the measurement detections, a group of the high confidence measurement detections that satisfy a high confidence threshold, a group of the low confidence measurement detections that satisfy a low confidence threshold, and a remaining group of other confidence measurement detections that do not satisfy the low confidence threshold or the high confidence threshold;

updating the tracks for a current measurement time to determine a respective PoE for each of the tracks at the current measurement time;

associating each of the tracks with zero, or one or more of the high confidence measurement detections and the low confidence measurement detections; and updating the estimated states of the tracks in response to associating each of the tracks with zero, or one or more of the high confidence measurement detections and the low confidence measurement detections.

13. The system of claim 12, wherein the processor is configured to associate each of the tracks with zero, or one or more of the high confidence measurement detections or the low confidence measurement detections by:

first, for each of the tracks, responsive to determining that the respective PoE for that track satisfies a high PoE threshold, associating that track with zero, or one or more of the high confidence measurement detections;

second, for each of the tracks not already associated with any high confidence measurement detections, and responsive to determining that the respective PoE for that track does not satisfy the high PoE threshold, associating that track with zero, or one or more of a remainder of the high confidence measurement detections;

third, for each of the tracks not already associated with any high confidence measurement detections, and responsive to determining that the respective PoE for that track satisfies the high PoE threshold, associating that track with zero, or one or more of the low confidence measurement detections;

fourth, for each of the tracks not already associated with any high confidence measurement detections or any low confidence measurement detections, associating that track with zero, or one or more of a remainder of the low confidence measurement detections; and fifth, based on any of the high confidence measurement detections not yet associated to any of the tracks, generating at least one new track to include in the tracks.

14. The system of claim 11, wherein the processor is further configured to:

maintain a separate series of low PoE tracks each generated based on any low confidence measurement detections not associated to any of the tracks; and output the separate series of low PoE tracks for use by the vehicle system in addition to outputting the tracks.

15. The system of claim 11, wherein the processor is configured to update the estimated states of the tracks during each of a plurality of tracker update cycles associated with the series of tracks.

16. The system of claim 11, wherein the processor is configured to:

include, in each of the tracks, an indication of the PoE for that track; and output, for use by the vehicle system, the tracks including the indications of the PoE.

17. The system of claim 11, wherein the processor is configured to:

maintain, based on an indication of the PoE for each of the tracks, a group of low PoE tracks and a group of non-low PoE tracks; and refrain from outputting any tracks from the group of low PoE tracks, while outputting all tracks from the group of non-low PoE tracks.

18. The system of claim 11, wherein the processor is configured to:

maintain, based on an indication of the PoE for each of the tracks, a group of low PoE tracks and a group of non-low PoE tracks; and in addition to outputting the group of non-low PoE tracks, output the group of low PoE tracks including an indication that each is associated with low PoE.

19. A non-transitory computer-readable storage media comprising instructions, that when executed, cause a processor to:

maintain a series of tracks including estimated measurements of at least some measurement detections output from an object detector model that processes sensor data to estimate portions of objects in an environment;

determine reported model confidence in the measurement detections based on estimates of uncertainties in the measurement detections for the object;

update estimated states of the tracks or generating new tracks based on a probability of existence (PoE) for the tracks and the reported model confidence in the measurement detections by, associating, based on both the PoE for the tracks and the reported model confidence, each of the tracks with one or more of the measurement detections classified as high confidence measurement detections or the measurement detections classified as low confidence measurement detections such that at least some of the tracks are associated with the low confidence measurement detections, and refining the estimated states of the tracks associated with low confidence measurement detections in subsequent update cycles using feedback from a fusion tracker incorporating ancillary information from other sensors to promote at least one of the tracks associated with the low confidence measurement detections to the high confidence measurement detections; and electronically instruct a vehicle system to control a vehicle to avoid the objects in the environment based on the updated tracks or new tracks.

\* \* \* \* \*